May 26, 1925.
R. F. HESTER
1,539,737
SEED PLANTER AND DISTRIBUTOR
Filed Feb. 25, 1924    2 Sheets-Sheet 1
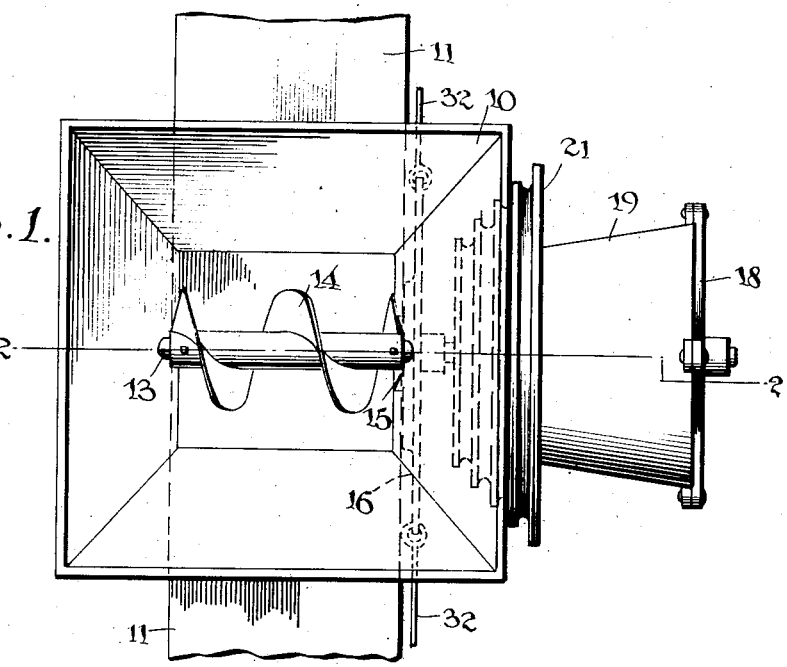
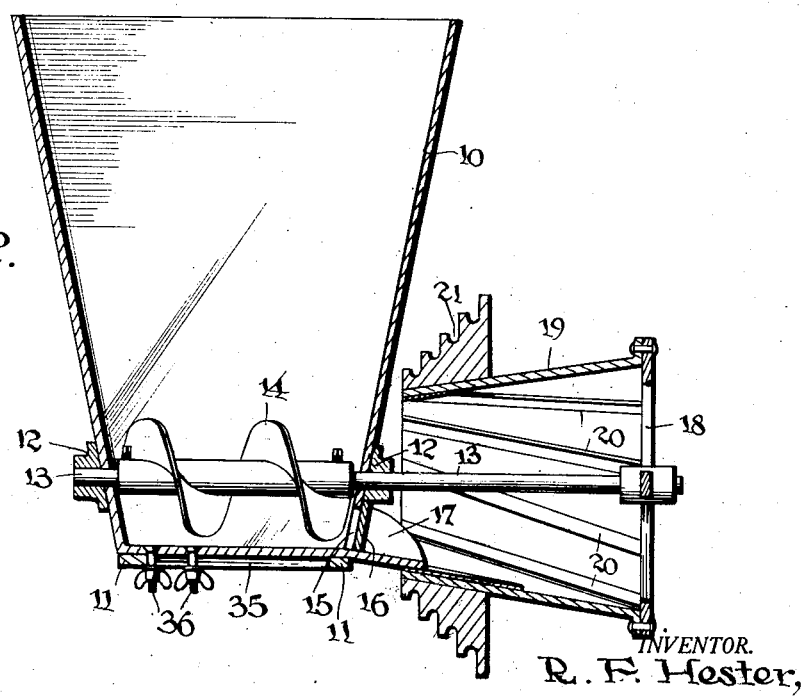
INVENTOR.
R. F. Hester,
BY
Geo. F. Kimmel
ATTORNEY.

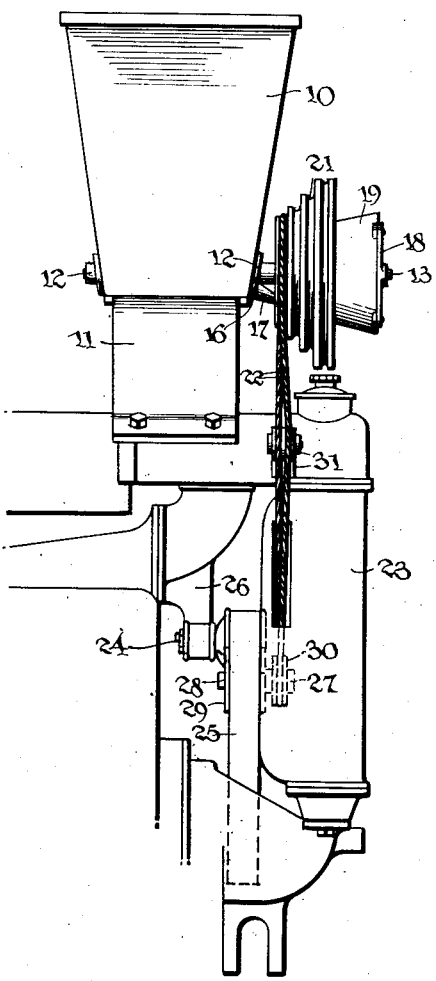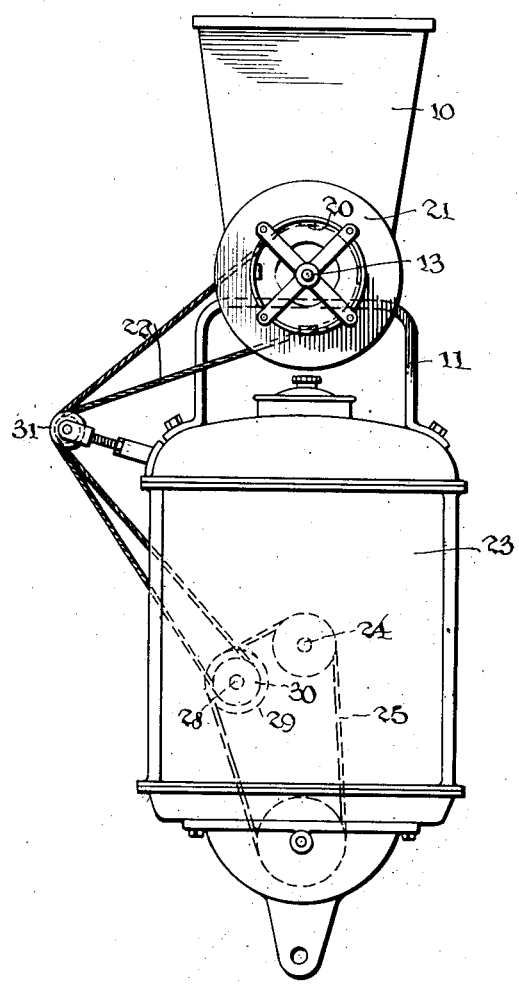

Patented May 26, 1925.

1,539,737

UNITED STATES PATENT OFFICE

RUSSEL F. HESTER, OF HEBER, CALIFORNIA.

SEED PLANTER AND DISTRIBUTOR.

Application filed February 25, 1924. Serial No. 695,083.

*To all whom it may concern:*

Be it known that I, RUSSEL F. HESTER, a citizen of the United States, residing at Heber, in the county of Imperial and State of California, have invented certain new and useful Improvements in Seed Planters and Distributors, of which the following is a specification.

This invention relates to seeding machines, whereby seeds of various kinds may be uniformly distributed upon the prepared ground, and thoroughly mixed or commingled prior to the discharge to insure uniformity in the distribution and growth.

Another object of the invention is to provide a device of this character, adapted to be coupled to a tractor or the like without material structural change either in the seeding device or in the tractor.

Another object of the invention is to provide a device of this character, having means for changing the speed of the seed discharging mechanism to render the device capable of adaptation to different kinds or sizes of seeds.

With these and other objects in view the invention consists in certain novel features of construction as hereinafter shown and described and then specifically pointed out in the claim and in the drawings illustrative of the preferred embodiment of the invention—

Figure 1 is a plan view of the seed hopper and its discharging mechanism.

Figure 2 is a vertical section on the line 2—2 of Figure 1, of the parts shown in Figure 1.

Figure 3 is a side elevation on a reduced scale, illustrating the manner of connecting the improved device to a conventional tractor.

Figure 4 is a front elevation of the parts shown in Figure 3.

The improved device comprises a seed hopper 10 mounted on a support 11, the latter adapted to be connected to a suitable carrier device, for instance a tractor, the forward portion of which is indicated conventionally in Figures 3 and 4. Mounted for rotation in bearings 12 through the lower part of the hopper 10 is a shaft 13 carrying a screw feed device 14.

The hopper 10 is provided with a discharge opening 15 over which a sliding valve member 16 is arranged to control the flow of the seed, the valve being operative by any suitable means by the driver from his seat on the tractor.

A guide chute 17 is arranged to guide the seeds as they are fed from the hopper by the action of the conveyor 14.

The shaft 13 extends beyond the hopper 10, and supported, for instance by a spider frame 18 mounted on the extended portion of the shaft, is a tapered cylindrical shell 19 into which the chute 17 extends, as shown in Figure 2.

The interior of the shell 19 is provided with a plurality of inclined and curved flights 20 operative as the shell is rotated to thoroughly mix or commingle the seeds and convey them through the shell and discharge them from its larger end.

Mounted on the shell 19 are a plurality of belt pulleys 21 of varying sizes, preferably in grooved form to receive a cord belt indicated at 22. By employing a plurality of the pulleys 20 of varying sizes, the speed of the shaft 13 can be increased or decreased to correspondingly control the feed, as will be obvious.

Any suitable means may be employed to rotate the pulleys 21, but preferably the motion of some portion of a tractor will be employed for that purpose, and for the purpose of illustration the motion of the fan belt of the tractor is shown arranged to produce the requisite motion.

In Figures 3 and 4 the forward part of a conventional tractor is shown including the radiator at 23, the fan shaft at 24, the fan belt at 25, and a portion of the bracket 26 for supporting the fan shaft.

A hanger, indicated at 27, is attached in any suitable manner to the fan casing and carries a stub shaft 28 and belt pulley 29, in alinement with the belt pulley of the fan shaft, and engaged by the fan belt 25, and rotated thereby, as indicated by dotted lines in Figure 4. The stub shaft 28 also carries a cord belt pulley 30 over which the cord belt 22 operates. A tightener device 31 of suitable construction is attached to the radiator 23 to take up the slack of the cord belt.

The hopper 10 is mounted for adjustment on the support 11, for instance by a slot 35 and clamp bolts 36, so that the hopper may be moved transversely of the support to enable any one of the cord pulleys 21 to be disposed in alinement with the cord pulley 30.

By this means the speed of the shaft 13 may be controlled to increase or decrease the speed of the seed discharge as required.

The controlling valve 16 is shown provided with pull cords 32 to operate the same and are designed to lead to a point convenient to the seat, not shown, of the driver of the tractor.

While a conventional and operative means is shown for transmitting the motion from the tractor to the shaft 13, I do not desire to be limited to the rotating means herein shown, as this means will be varied as circumstances may require, or as the forms of the different makes of tractors or other motive power may require.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

In a seed scattering device, a support adapted to be attached to a traversing machine, said traversing machine having a driving element, a supply hopper, an outlet for said hopper, a shaft extending through said hopper and having a portion extending beyond said hopper, said shaft carrying a feed element within the hopper, a hollow scattering member of frusto-conical formation attached to said shaft externally of said hopper and in communication with the outlet of said hopper, a plurality of belt pulleys of varying size mounted on one end of said scattering member and concentric therewith, a drive belt operating over a selected one of the belt pulleys and the driving element of the traversing machine, and means for adjustably coupling the said hopper and its attachments to said support to respectively aline the belt pulleys with the driving element of the traversing machine.

In testimony whereof, I affix my signature hereto.

RUSSEL F. HESTER.